United States Patent
Sosabowski et al.

(10) Patent No.: US 8,120,841 B2
(45) Date of Patent: Feb. 21, 2012

(54) OPTICAL COMB FREQUENCY SOURCE

(75) Inventors: Jeremy Sosabowski, Cambridge (GB); Dominic Joseph Mikulin, Cambridge (GB)

(73) Assignee: Optisynx Ltd., Cambridge (GB)

( * ) Notice: Subject to any disclaimer, the term of this patent is extended or adjusted under 35 U.S.C. 154(b) by 458 days.

(21) Appl. No.: 12/084,918

(22) PCT Filed: Nov. 17, 2006

(86) PCT No.: PCT/GB2006/050396
§ 371 (c)(1), (2), (4) Date: May 13, 2008

(87) PCT Pub. No.: WO2007/057713
PCT Pub. Date: May 24, 2007

(65) Prior Publication Data
US 2009/0284828 A1    Nov. 19, 2009

(30) Foreign Application Priority Data
Nov. 18, 2005    (GB) ................................ 0523522.1

(51) Int. Cl.
G02F 1/35    (2006.01)
H01S 3/30    (2006.01)

(52) U.S. Cl. ............... 359/326; 372/6; 372/18; 372/25

(58) Field of Classification Search .................. None
See application file for complete search history.

(56) References Cited

U.S. PATENT DOCUMENTS

| | | | |
|---|---|---|---|
| 6,816,515 B1 * | 11/2004 | Yun et al. | 372/18 |
| 2004/0075890 A1 * | 4/2004 | Kim et al. | 359/341.1 |
| 2004/0076199 A1 * | 4/2004 | Wipiejewski et al. | 372/26 |
| 2004/0213302 A1 * | 10/2004 | Fermann et al. | 372/6 |

* cited by examiner

Primary Examiner — Hemang Sanghavi
(74) Attorney, Agent, or Firm — Wolf, Greenfield & Sacks, P.C.

(57) ABSTRACT

This invention relates to methods and apparatus for generating an optical frequency comb. In embodiments a passive mode locked optical waveguide comb uses electrical or optical tuning for the mode spacing frequency (df) and the carrier envelope offset frequency ($f_{ceo}$). We describe a passive mode locked optical comb frequency source comprising: an optical cavity having an optical driver and an optical output to provide an optical comb; an absorbing element coupled to said optical cavity for producing said optical comb; and an optically or electrically controllable element in said optical cavity; and wherein said optically or electrically controllable element has an optically or electrically controllable refractive index such that said refractive index is variable to vary one or both of a mode spacing and a carrier envelope offset frequency of said optical comb.

29 Claims, 6 Drawing Sheets

OPTICAL COMB FREQUENCY SOURCE

CROSS REFERENCE TO RELATED APPLICATIONS

This application is a national stage application of the international application PCT/GB2006/050396 filed on Nov. 17, 2006, which claims priority to United Kingdom application No. 0523522.1 filed Nov. 18, 2005.

This invention relates to methods and apparatus for generating an optical frequency comb. In embodiments a passive mode locked optical waveguide comb uses electrical or optical tuning for the mode spacing frequency (df) and the carrier envelope offset frequency ($f_{ceo}$).

In this specification we are concerned with passive mode locked optical comb frequency sources, which do not rely upon an external RF source to maintain mode locked operation. References to "optical" include frequencies from terahertz (extreme infrared) to petahertz (extreme ultraviolet).

A mode locked comb laser can be used to produce a frequency comb with a plurality of regularly spaced frequency modes as defined by the pulse repetition rate of the laser. The mode locked comb laser can either be active (in which the repetition is triggered by an external RF, radio frequency, source) or passive (does not need such a source). Either way the output of the mode locked laser is a periodic train of narrow pulses which produces a comb of equally spaced frequencies.

The comb of equally spaced frequencies can be described using equation below:

$$f_n = n*df + f_{ceo}$$

Where $f_n$ is the frequency of the $n^{th}$ line of the frequency comb, n is a large integer (which can be as high as $10^6$), df is the frequency spacing between the modes and $f_{ceo}$ is the carrier envelope offset frequency. The carrier envelope offset frequency can be explained by considering the differences between the group velocity and phase velocity inside the laser.

The two degrees of freedom of the laser comb (i.e. df and $f_{ceo}$) generally have to be known and controlled in order to correctly use a frequency comb. The mode frequency spacing is controlled by changing the effective optical cavity length of the laser. Previous methods of tuning the mode frequency spacing include thermal tuning and mechanical tuning which include piezo actuators or other stretching or compression setups. Example of mechanical and thermal tuning are provided in Y. W. Song et al, IEE Photonics Technology Letters, 13(2001), pp 1167-1169 and de Lima et al, proceedings of the 2001 SBMO/IEEE MTT-S International Microwave and Optoelectronics Conference, (1)2001 pp 115-117. Other prior art can be found in GB2381121. However the prior art systems have problems including the response times, susceptibility to external environmental conditions (such as temperature and vibrations).

The inventors have recognised that the response time, susceptibility to external environmental conditions (such as temperature and vibrations) and the reliability can be improved by using electrically or optically tunable elements.

We therefore describe a passive mode locked optical comb frequency source, comprising: one or more optical cavities, including an optical driver and an output; and at least one controllable element for controlling one or more parameters of the optical comb and coupled, directly or indirectly to said optical cavity or cavities, for producing said optical comb; and wherein said controllable element is controllable, for example electrically or optically. The controllable element may be in the cavity (which may be an optical loop) or coupled indirectly, for example by a circulator. In the latter case it effectively defines a cavity, for example via the circulator, so that in this situation it may also be said to be in the cavity. In embodiments there may be more than one coupled optical cavity or loop.

The controllable element may be directly electrically controlled, for example by means of electrical contacts or it may be optically controlled, in particular by configuring the frequency source, say by including a coupler, to enable control light to be injected to control the controllable element. The control light may be provided by a laser, light emitting diode (LED) or other light source, for example under electrical control.

Preferably the controllable element has a refractive index which is optically or electrically variable to vary one or more parameters of the comb.

Thus in a first aspect of the invention there is provided a passive mode locked optical comb frequency source comprising: an optical cavity having an optical driver and an optical output to provide an optical comb; an absorbing element coupled to said optical cavity for producing said optical comb; and an optically or electrically controllable element in said optical cavity; and wherein said optically or electrically controllable element has an optically or electrically controllable refractive index such that said refractive index is variable to vary one or both of a mode spacing and a carrier envelope offset frequency of said optical comb.

The controllable element may be directly in the cavity or indirectly in the cavity, for example connected via a circulator, in the latter case effectively defining a cavity via the circulator (so that in this situation it may also be said to be in the cavity). Thus the controllable element effectively defines resonant frequencies of the cavity. Thus preferably but not essentially, the optical cavity is an optical resonant cavity.

The cavity may comprise an optical loop; in some preferred embodiments the controllable element comprises a saturable absorber.

Thus in a related aspect the invention provides a passive mode locked optical comb frequency source, comprising: an optical loop including an optical driver and an output; and a saturable absorber coupled to said optical loop, for producing said optical comb; and wherein said saturable absorber is electrically controllable.

Preferably the saturable absorber comprises a semiconductor optical device or more particularly a semiconductor optical cavity, for example a multiple quantum well cavity. A semiconductor laser cavity maybe employed, although the unity round-trip gain constraint on such a cavity for lasing is not a constraint for use of such a cavity as a saturable absorber. (In this specific context the skilled person will appreciate that cavity is used in a broad sense since the semiconductor cavity of the semiconductor will not in general be resonant—unlike the (resonant) cavity of the optical comb). Embodiments of the frequency source we describe later employ such a semiconductor laser cavity and, as such, include a reflecting facet or mirror at one end. However this is because of practical considerations (the reflecting facet is hard to remove without causing damage), and it is likely that embodiments without such a reflecting facet would in fact work better.

Alternatively the saturable absorber may comprise an optical element including a doped crystalline material, in particular a chromium (ion) doped crystalline material. The crystalline material may comprise any suitable material including, but not limited to, ruby, garnet, silicate, germinate, apatite, colquiriite or a chalcogenide.

In embodiments the saturable absorber, for example the semiconductor optical cavity or device, includes a controllable tuning element and it is this feature of the saturable absorber which is electrically (or optically) tunable—the absorption per se need not be controllable, electrically or otherwise. In embodiments the controllable tuning element enables electrical or optical timing to adjust a centre wavelength of the comb. It will be appreciated that the optical comb need not have an output frequency at the exact centre of the comb. (The tunable element changes the peak wavelength, which has the effect of moving the comb along the frequency axis, changing the carrier envelope offset frequency). The tunable element preferably comprises a Bragg grating although some other frequency selective element may also be employed. Preferably the cavity also includes a controllable phase shift element for adjusting a mode spacing of the comb (by adjusting the pulse repetition rate of the source).

In preferred embodiments the semiconductor optical cavity includes a gain section which is biased to provide optical absorption; the frequency source preferably therefore comprises a driver for biasing this portion of the cavity into absorption. As previously mentioned, the absorption need not be controllable, electrically or otherwise. Typically the gain section of a semiconductor optical cavity is reverse (negatively) biased, although, in embodiments, optical absorption may be provided even with a small positive bias.

Since the mode locked optical comb frequency source is passive rather than active, preferably the bias is applied to the gain section to provide substantially continuous absorption.

In embodiments further control of the optical frequency comb may be provided by controlling the optical driver, for example by controlling a source or driver for a semiconductor laser optical driver for the comb frequency source. Thus again such a pumpsource laser may be electrically controlled (by controlling a power supply to the pump) or optically controlled, for example by configuring the system, say by including a coupler, to enable control light to be injected to control the pump. The control light may be provided by a laser, light emitting diode (LED) or other light source, for example under electrical control.

The invention further provides a photonic integrated circuit (PIC) configured to implement an optical comb frequency source, the PIC comprising: an optical input to receive a pump signal; an optical output to provide an optical comb output signal; an optical cavity coupled to said optical input and to said optical output, said optical cavity including a gain medium; and a control block coupled to said optical cavity for controlling one or both of a comb spacing and a carrier envelope offset frequency of said optical comb.

In some preferred embodiments the photonic integrated circuit (PIC) includes an optical coupler (multiplexer/demultiplexer) with first and second connections to the optical input and output and a combined optical connection to carry a combination of the pump signal and the optical comb output signal. This may be implemented at a wavelength-selective optical coupler. Preferably the control block includes at least one optically or electrically controllably optical element, preferably one or more of an absorber, a phase control element, and a controllable frequency selective element. The control of such an element may either be by direct electrical control or may be remoted to enable optical control. In this latter case, an optical control input may also be provided to couple control light to the control block. In this way parameters of the comb may be optically adjustable.

In embodiments the optical cavity includes a waveguide with reflecting elements or mirrors to either side of the gain medium (in an optical path through the device), one of these mirrors being formed by the control block, preferably a tunable grating in the control block. Optionally this tunable grating may be followed by an anti-reflective element to reduce unwanted reflections.

In embodiments the PIC may include the pump signal source, coupled to the optical input, for example by hybrid integration on a common substrate. The carrier envelope offset frequency may then be adjusted by controlling the pump source. Preferably, but not essentially, the pump signal source comprises a laser. Preferably the PIC is implemented using on-chip waveguide technology, in particular for the optical connections between the above-described elements, and for the gain section.

In another aspect the invention provides an optical comb frequency source comprising: an optical cavity or loop including an optical driver and an output; and a saturable absorber coupled to said optical cavity or loop, for producing said optical comb; and wherein said saturable absorber comprises a semiconductor optical cavity including one or both of an optical phase control region and an optical filter region, at least one of said phase control region and said filter region including an electrical connection for control of one or more parameters of said optical comb.

As mentioned above, the frequency source may include more than one optical cavity, and the saturable absorber may be coupled directly (within the cavity) or indirectly (for example, via a circulator).

In embodiments the optical phase control region controls an effective length of the semiconductor optical cavity. The cavity preferably comprises a pair of high reflectivity elements; such an element may be fabricated in a conventional manner for a semiconductor diode laser, using techniques well known to those skilled in the art. Preferably one of these elements comprises a Bragg grating (which, in embodiments, acts as a reflecting filter).

The invention further provides an optical comb frequency source comprising: a first electrically or optically controllable system to control a spacing of said comb; and a second electrically or optically controllable system to control a frequency of said comb.

The invention further provides a method of controlling one or both of a comb spacing and a comb centre frequency in a passive mode locked optical comb frequency source, the method comprising electrically or optically controlling a semiconductor optical cavity saturable absorber (or semiconductor optical device saturable absorber) of said frequency source.

In a still further aspect the invention provides a mode locked comb laser with a solid state device to provide one or both of: an electrically or optically tunable mode frequency spacing; and an electrically or optically adjustable carrier envelope offset frequency.

The invention also provides an RF frequency downconversion system comprising: an optical comb generator to provide an optical comb; a second optical frequency source to provide a pair of optical frequencies; a coupler to combine outputs of said comb generator and said second optical frequency source; a non-linear optical element having an output to a first optoelectronic transducer to provide an electrical signal dependent upon a non-linear interaction between outputs of said comb generator and said second frequency source; and an optical output coupled to a second optoelectronic transducer to provide an RF output; and wherein said comb generator is configured for control by said electrical signal; and wherein said non-linear optical element follows said coupler along a direction of light propagation through the system.

The invention also provides An RF frequency downconversion system comprising: an optical comb generator to provide an optical comb; a second optical frequency source to provide a pair of optical frequencies; a coupler to combine outputs of said comb generator and said second optical frequency source; a non-linear optical element to provide an electrical signal dependent upon a non-linear interaction between outputs of said comb generator and said second frequency source; an optical output coupled to a second optoelectronic transducer to provide an RF output; and wherein said comb generator is configured for control by said electrical signal; and wherein said second optical frequency source comprises a gas, and wherein said pair of optical frequencies comprises first and second frequencies at respective first and second absorption dips in said gas, said first and second frequencies not being harmonically related to one another.

These and other aspects of the invention will now be further described, by way of example only, with reference to the accompanying figures in which.

In the figures, the numbered elements are as follows:
1. Contact 1 (gain section) connected to source 1a
1a Gain section driver (voltage or current), the gain section is biased in such a way (for example using negative or reverse bias) as to provide optical loss/optical absorption. This saturable absorption is required to mode lock the resonating cavity (or cavities) by increasing the net gain for short pulses and by reducing the net gain for CW (continuous wave) operation.
2. Contact 2 (phase section) connected to source 2a
2a Phase section driver (voltage or current) used to adjust the effective cavity length. This can be used to change the mode spacing (df) of the comb.
2b Phase section driver (voltage or current); in this variant this driving signal is kept constant
3. Contact 3 (grating section) connected to source 3a
3a Grating section driver (voltage or current) used to adjust grating wavelength, tuning this section changes the grating reflectivity wavelength. This can be used to change the mode spacing (df) and/or the comb centre wavelength (carrier envelope offset frequency).
3b Grating section driver (voltage or current), this driving signal is kept constant One or more of elements 1, 2 and 3 may be provided as part of a monolithic semiconductor device or element, for example a tunable laser element. Alternatively (less preferably) they may be separate elements, optionally (but still less preferably) disposed at different positions within a resonant cavity.
4. Output port (i.e. comb output)
5. Polarisation controller (allows adjustment of polarisation state, e.g. by mechanical adjustment of a fiber), this is required for mode locking.
6. Section of gain material (examples include fiber or planar optical waveguide doped with rare earth ions such as Erbium, Ytterbium or Thulium)
7. Wavelength Dependant multiplexer/Coupler used to couple the optical pump into the resonating cavity (or cavities)
8 Micro lens to improving coupling from the waveguide into the control device
9 AR (Anti reflection) coating (to suppress reflections at wavelengths which are not to be reflected back into the cavity)
9a Reflecting facet (comes with the tunable laser block employed; optional and performance may improve without this)
10. Circulator
12. Pump laser (examples include laser diodes at 980 nm or 1480 nm)
12a. Electrical driver (power supply) for pump laser (current or voltage driver), this source driver is also used to adjust the carrier envelope offset frequency ($f_{ceo}$)
12b Electrical driver (power supply) for pump laser (current or voltage driver), this source driver is kept constant
14 Waveguide such as optical fiber or planar optical waveguide, if required this waveguide can have negative dispersion properties for pulse compression purposes. This pulse compression can be used to increase the comb spa.
15 Coupler used to couple light out of the resonating cavity (or cavities)
16 Optical isolator
17 Dielectric mirror
18 Coupler used to inject light into optical pump source
19 Optical input to control $f_{ceo}$
20 Coupler used to inject light into optical comb control device
21 Optical input to control df and/or comb centre wavelength
Elements 1a, 1b, 1c and 12a may each comprise a variable power supply; element 12b may comprise a fixed power supply.

Figure 1:
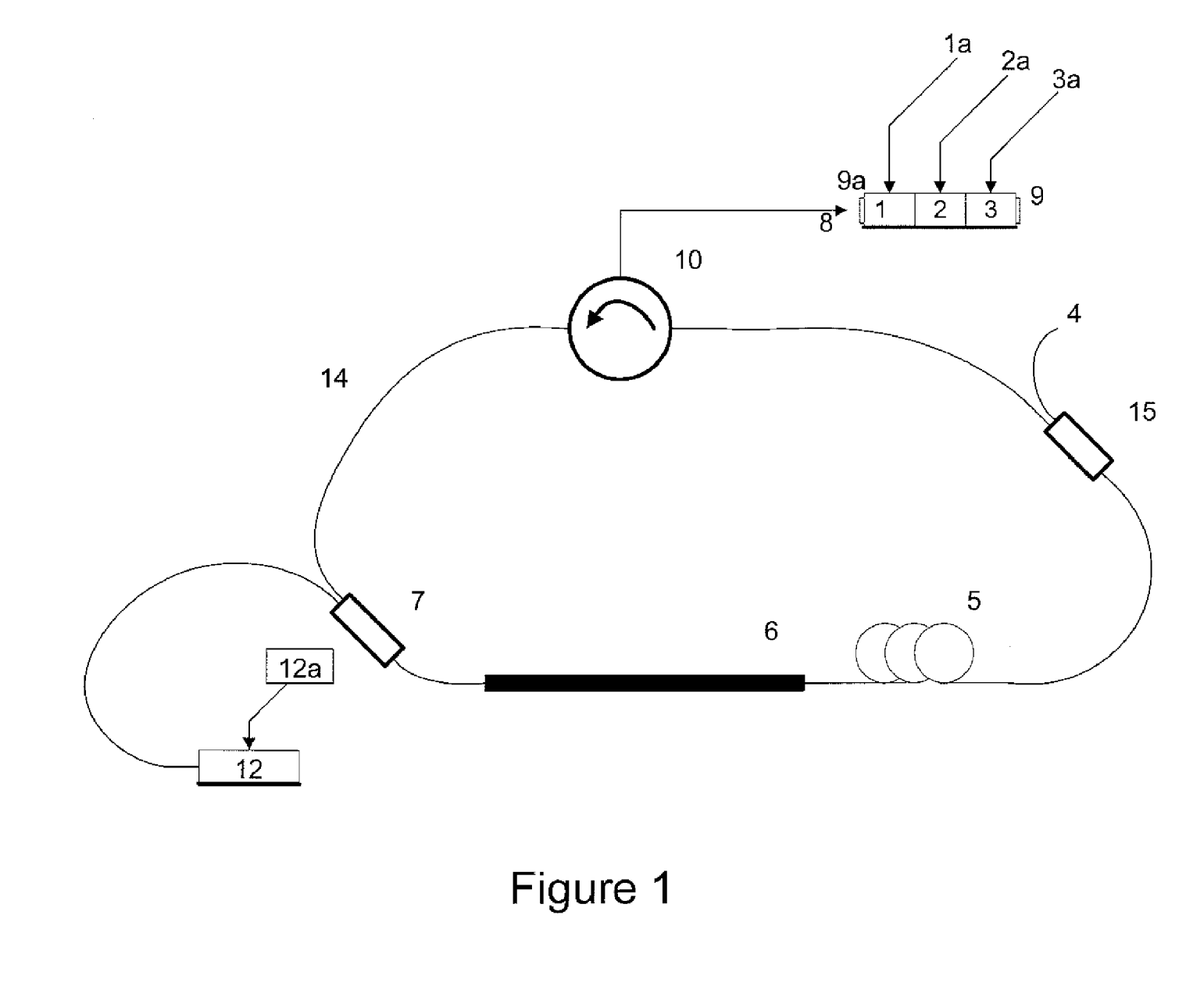
FIG. 1 shows a first example of an optical comb frequency source according to an embodiment of the present invention.

We first refer to FIG. 1. The electrically tunable element considered in FIG. 1 is based on an electrically tunable Bragg grating and an electrically tunable phase section. In preferred embodiments the saturable absorber comprises a negatively biased gain section of a semiconductor laser cavity. In embodiments this cavity has three sections (1-3) as shown in the figure. The saturable absorber (section 1, controlled by source 1a in FIG. 1) used for mode locking can be integrated or separated from the tuning components by using an additional circulator. The biasing of section 1 is negative with regards to ground potential, to provide (controllable) absorption.

The remaining sections are used for fine tuning the cavity length (section 2, controlled by source 2a) and for tuning the centre output wavelength (section 3, controlled by source 3a). The fine tuning (source 2a) can also be used to prevent "mode hops". The carrier offset frequency can be adjusted by changing the current (contact 12a) to the pump laser (12). (The order of elements 1, 2 and 3 shown in FIG. 3 with respect to light incident via the circulator may be reversed (though this is less preferable than the arrangement shown).

Example details for the sections 1, 2 and 3 are as follows:

Gain section: Semiconductor optical material (such as InGaAsP, GaAs or InP) with optical gain (or optical absorption) at the relevant wavelength. The optical gain is provided by electrically exiting the carriers into higher energy states. This absorption of this is adjusted, for example experimentally, so that the frequency source pulses.

Phase section: Semiconductor optical material (such as InGaAsP, GaAs or InP) with electrically (or optically) tunable refractive index. Electrically (or optically) induced changes to the refractive index changes the effective optical length.

Grating sections: Semiconductor optical material (such as InGaAsP, GaAs or InP) with electrically tunable refractive index, incorporating a frequency selective element such as a Bragg grating. Electrically (or optically) induced changes to the refractive index changes the effective frequency of the frequency selective element.

The source (12*a*) supplies the pump laser (12) which is used to excite the rare earth ions in the section of doped waveguide (6). The optical gain provided by the excited ions is used to create an optical field. The optical field does not reach a CW (continuous wave) lasing condition because the saturable absorber (1) prevents such a build up; instead the system pulses. If required the resulting short pulse can further be compressed in time using a waveguide with negative dispersion properties (14). The pulsation performance and stability of the setup can also be improved by incorporating isolators in the loop and/or following laser 12, to prevent undesirable feedback (not shown in FIG. 1).

Figure 2:
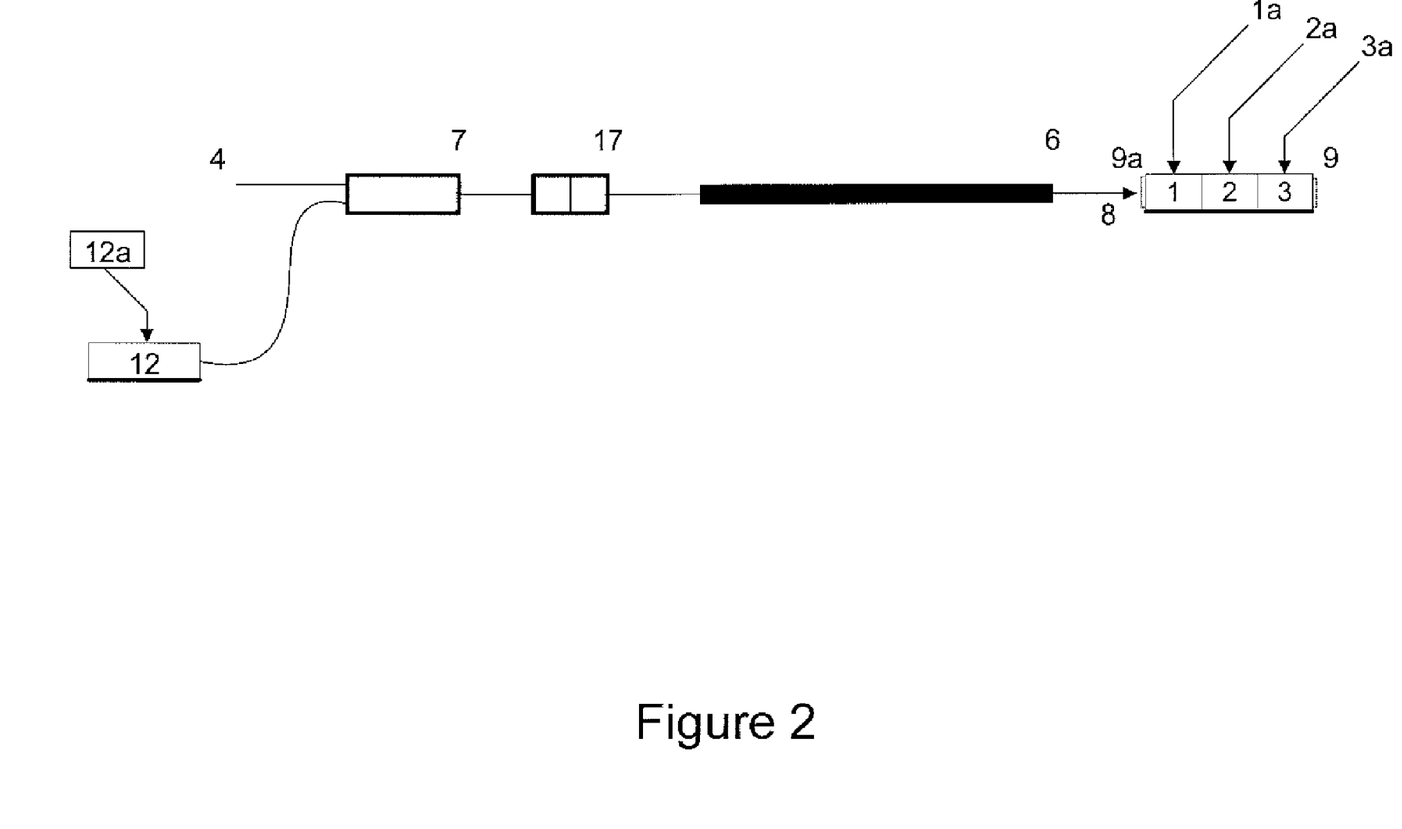
FIG. 2 shows a second example of an optical comb frequency source according to an embodiment of the present invention.

We now refer to FIG. 2. The optical comb generator shown in FIG. 2 is particularly well suited for monolithic or hybrid integration using "silica on silicon" or other types of integration technologies, in particular photonic integrated circuit technologies. The low number of components and the (preferred) absence of any mechanical components (such as polarisation controllers) also make suitable for low cost optical subassemblies. Elements 4, the input from 12, 7, 17, 6 and, where present, 8, may be implemented on a single substrate; in a hybrid device either or both of the pump laser 12 and the control block 1, 2 and 3 may also be provided on the substrate. Although in embodiments the device may be entirely solid state, in variants the controllable frequency selective element may be implemented using a MEMS (micro electromechanical system)-based adjustable grating, for example using a "MEMS based" micromechanical actuator to adjust the tilt of a small grating.

Figure 3:
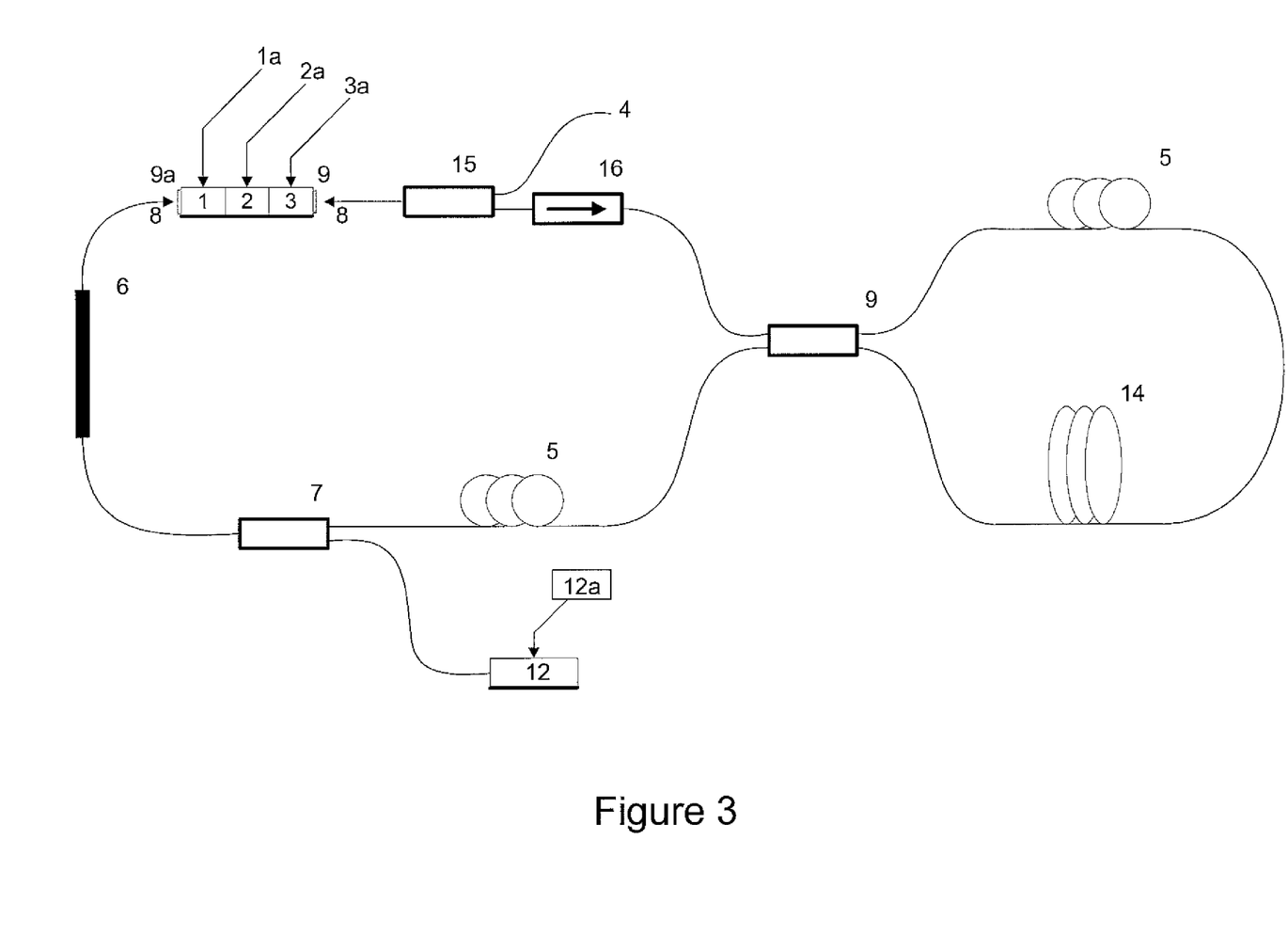
FIG. 3 shows a third example of an optical comb frequency source according to an embodiment of the present invention.

We now refer to FIG. 3 (a variant of FIG. 1). The optical comb generator shown in FIG. 3, (based on a FIG. 8 type layout), can be used to generate very narrow pulses. These narrow pulses generate an optical comb with a very wide frequency span the comb may therefore no longer require a "comb expander" as used to increase the number comb lines.

Figure 4:
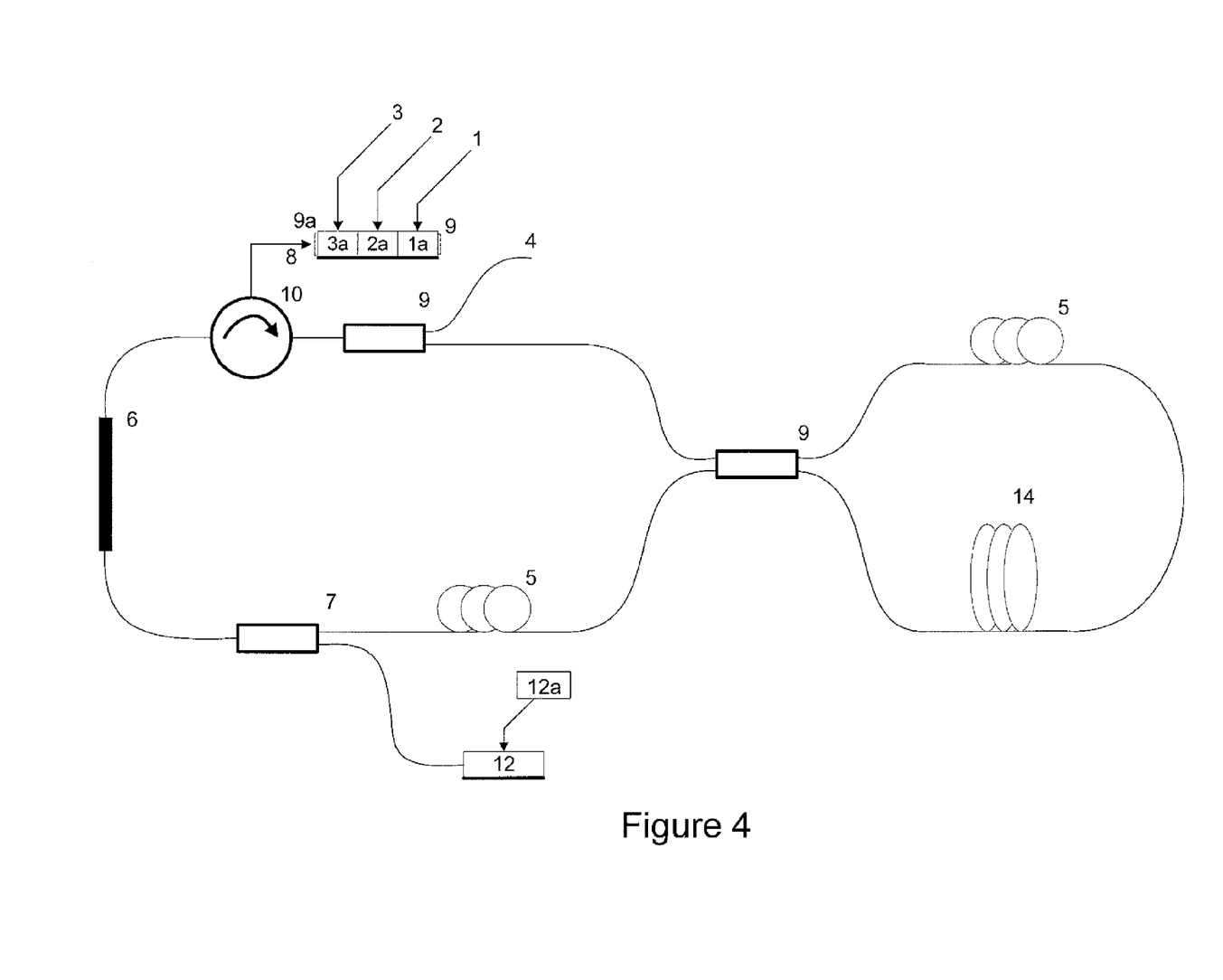
FIG. 4 shows a fourth example of an optical comb frequency source according to an embodiment of the present invention.

We now refer to FIG. 4 (a variant of FIG. 1 with similar construction to FIG. 3). The optical comb generator shown in FIG. 4, (based on a FIG. 8 type layout), can be used to generate very narrow pulses. These narrow pulses generate an optical comb with a very wide frequency span the comb may therefore no longer require a "comb expander" as used to increase the number comb lines. The semiconductor control element has been removed from one of the loops and therefore no longer contributes to pulse broadening. This results in an output with even narrower pulses/wider comb span.

Figure 5A:
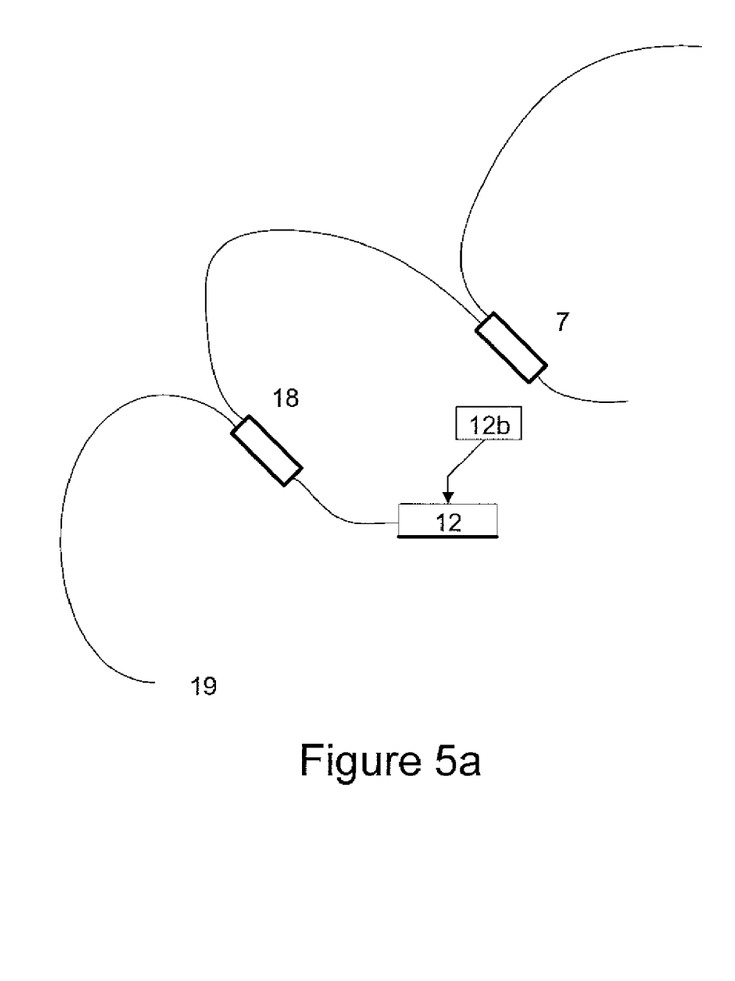
FIGS. 5a and 5b show modifications to which may be made to the optical comb frequency sources of FIGS. 1 to 4 to make the sources optically tunable showing, respectively, an arrangement for injecting control light into the optical pump and an arrangement for injecting control light into an optical comb generator control device.
Figure 5B:
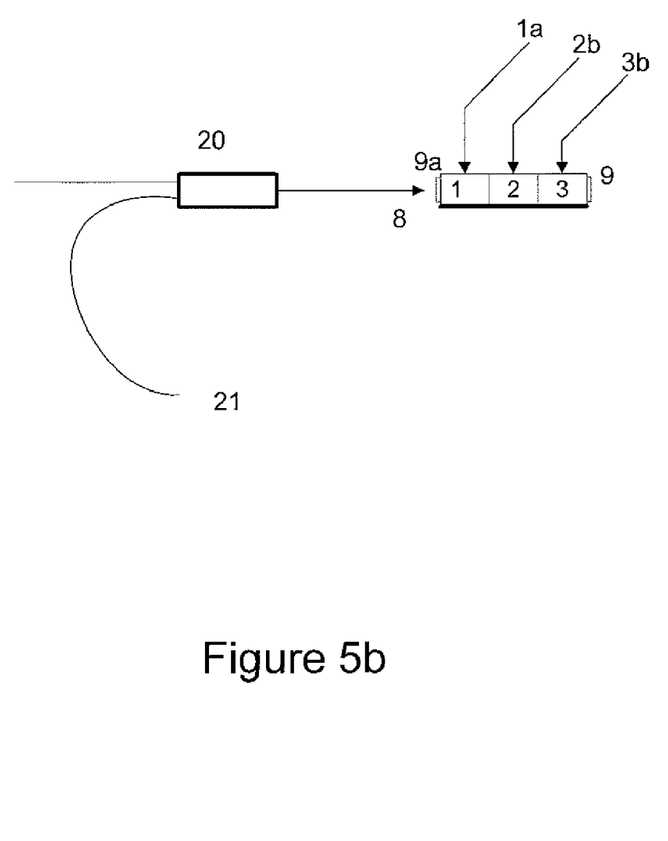

We now refer to FIG. 5, which shows details of optical tuning of the optical comb generator.

FIG. 5*a* shows injecting control light into the optical pump source changes the carrier concentration inside this device. Changes in carrier concentration will change the output power of the optical pump source and this can therefore be used to tune the carrier envelope offset frequency ($f_{ceo}$).

FIG. 5*b* shows injecting control light into the optical comb generator control device will change the carrier concentration inside this device. The associated changes in refractive index induced by carrier concentration changes will change the effective optical path length and the Bragg reflection wavelength. This control light can therefore be used to tune both the mode spacing (df) and/or the centre comb wavelength.

Figures 6, 6A:
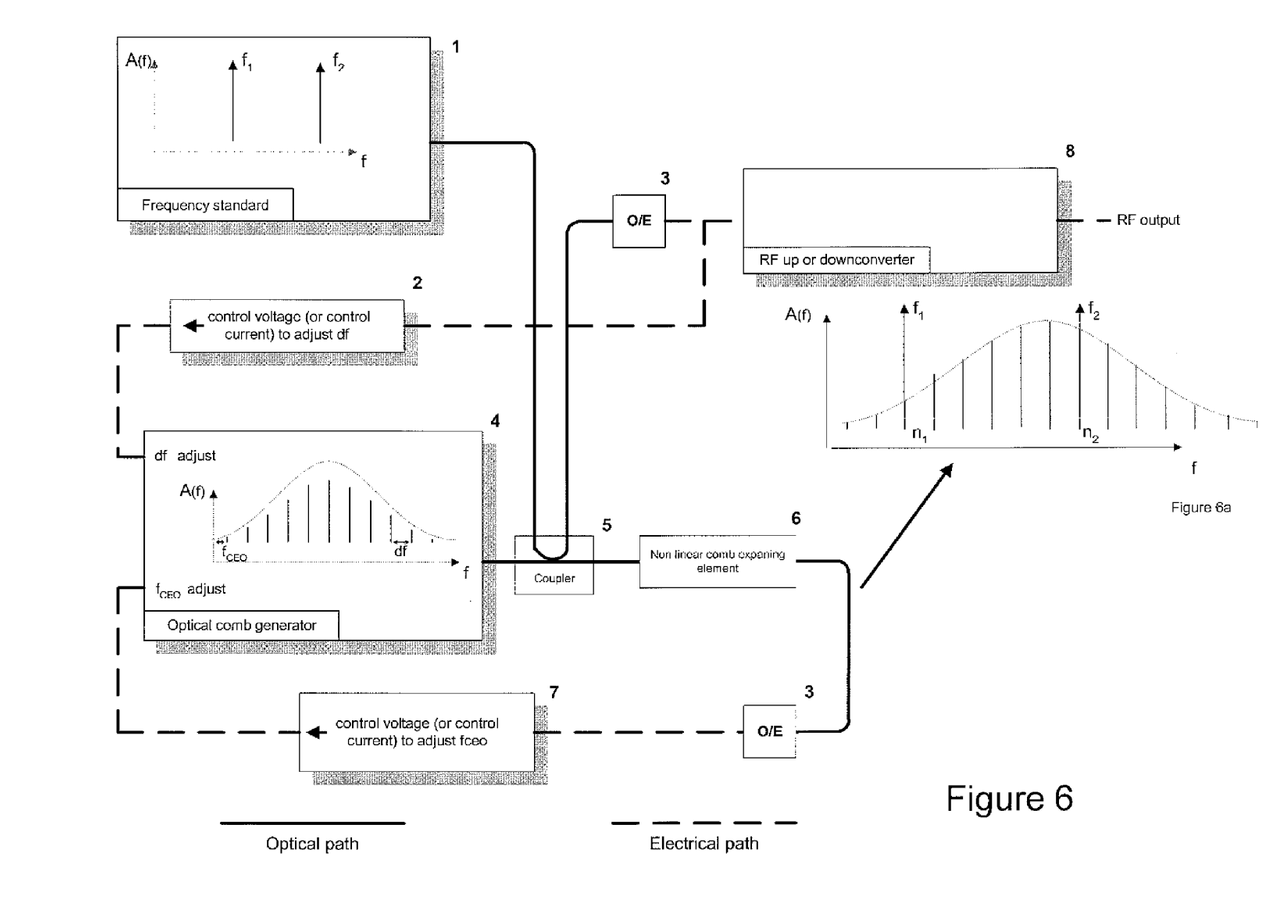
FIG. 6 shows an example application of an optical comb frequency source according to an embodiment of the present invention in a system for frequency downconversion, for example, for use in metrology.

FIG. 6 shows an example practical application the optical frequency comb generator, for metrology, in which the optical comb is used for frequency downconversion. The output of the system is an RF signal that is locked to the frequency standard (component 1).

The frequency of the frequency standard can be very high (in the THz or even PHz range). The stability, accuracy and phase noise properties of this frequency standard are maintained during the frequency down conversion process.

Descriptions of components in FIG. 6:

1) Frequency standard with 2 outputs (f1 and f2) at different frequencies:

Examples of such a frequency standard include a laser locked to absorption dips in gasses such as iodine, carbon monoxide, acetylene, methane, hydrogen cyanide (and many other gases). The second frequency of this standard could be a harmonic of the first frequency or alternatively it could be a second absorption dip in the same gas.

Alternatively this frequency standard could also be a based on single trapped ions or atoms such as strontium, calcium or mercury.

In both cases the harmonic of the frequency standard could be generated using harmonic generation crystals such as (periodically poled) KTP or LiNb crystals.

2) Circuit for df frequency control. This circuit isolates (using filter(s)) the df frequency and produces a control signal proportional to the frequency (or phase) of df. This control signal is used to drive the optical frequency comb generator and to lock one of the comb lines to f2.

3) Optical to electrical converter (such as a photodiode), this element also acts as non linear element for obtaining the mixing product ("i.e. beat term") of the optical input signals.

4) Solid state tuneable frequency comb generator (as described elsewhere in the patent), both the carrier envelope offset frequency ($f_{ceo}$) and the mode spacing frequency (df) are adjustable. The output of this generator is an optical comb.

5) Optical combiner/optical coupler

6) Non linear comb expanding element used to increase the number of comb lines such that the comb now also covers the first frequency (f1) of the optical standard, as illustrated in FIG. 6*a*. Examples of linear comb expanding elements include microstructure fiber, photonic crystal fiber or (periodically poled) non linear optical crystals such as KTP and LiNb.

7) Circuit for $f_{ceo}$ frequency control. This circuit isolates (using filter(s)) the $f_{ceo}$ frequency and produces a control signal proportional to the frequency (or phase) of df. This control signal is used to drive the optical frequency comb generator and to lock one of the comb lines to f1.

8) RF up or down-converter, this circuit is used to increase or decrease the RF output frequency.

The operating principle is as follows: Using feedback loops that continuously adjust the input comb parameters (df and $f_{ceo}$), two distinct comb lines ($n_1$ an $n_2$) of the optical comb generator are locked to the two optical components (f1 and f2) of the frequency standard. The comb spacing frequency (df)

can directly be used as the RF output, alternatively the RF up or down-converter (component 8) can be used to change the RF output frequency.

Embodiments of the frequency comb generator we have described can be used for a range of applications including, but not limited to: time generating systems, metrology, frequency down-conversion, bio medical imaging for example optical coherent tomography, and telecommunications for example WDM (wavelength division multiplexed) wavelength sources.

If desired, the frequency comb can be broadened by using non linear materials such as microstructure fibre, photonic crystal fibre or (periodically poled) non linear optical crystals such as KTP and LiNb.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A passive mode locked optical comb frequency source comprising:
    an optical cavity having an optical driver and an optical output to provide an optical comb;
    an absorbing element coupled to said optical cavity for modulating an optical intensity in the optical cavity and for producing said optical comb; and
    an optically or electrically controllable element in said optical cavity; and
    wherein said optically or electrically controllable element has an optically or electrically controllable refractive index such that said refractive index is variable to vary one or both of a mode spacing and a carrier envelope offset frequency of said optical comb.

2. An optical comb frequency source as claimed in claim 1 wherein said controllable element comprises at least one semiconductor optical device.

3. An optical comb frequency source as claimed in claim 2 wherein said semiconductor optical device includes a controllable tuning element to provide a controllable saturable absorber to produce pulses in said optical resonating cavity.

4. An optical comb frequency source as claimed in claim 2 wherein said semiconductor optical device or cavity includes an electrically or optically controllable tuning element for adjusting a centre wavelength of said comb.

5. An optical comb frequency source as claimed in claim 4 wherein said electrically or optically controllable tuning element comprises a Bragg grating.

6. An optical comb frequency source as claimed in claim 2 wherein said semiconductor optical device or cavity includes an electrically or optically controllable phase shift element for adjusting a mode spacing of said comb.

7. An optical comb frequency source as claimed in claim 2 wherein said semiconductor optical device or cavity includes a gain section, and wherein the frequency source further comprises a driver to bias said gain section into optical absorption.

8. An optical comb frequency source as claimed in claim 7 wherein said driver is configured to bias said gain section into continuous optical absorption.

9. A frequency downconversion system including a frequency source as claimed in claim 1.

10. An optical comb frequency source as claimed in claim 1 wherein said optical driver is controllable for controlling said optical frequency comb.

11. The passive mode locked optical comb frequency source of claim 1, further comprising:
    an optical loop coupled to the optically or electrically controllable element,
    wherein said absorbing element comprises a saturable absorber that is electrically or optically controllable.

12. An optical comb frequency source as claimed in claim 11, further comprising an optical circulator disposed between the optical loop and the optically or electrically controllable element, wherein said saturable absorber comprises a semiconductor optical cavity.

13. An optical comb frequency source as claimed in claim 12 wherein said electrically or optically controllable element comprises a Bragg grating.

14. An optical comb frequency source as claimed in claim 12 wherein said semiconductor optical device or cavity includes an electrically or optically controllable phase shift element for adjusting a mode spacing of said comb.

15. An optical comb frequency source as claimed in claim 12 wherein said semiconductor optical device or cavity includes a gain section, and wherein the frequency source further comprises a driver to bias said gain section into optical absorption.

16. An optical comb frequency source as claimed in claim 15 wherein said driver is configured to bias said gain section into continuous optical absorption.

17. An optical comb frequency source as claimed in claim 11 wherein said optical driver is controllable for controlling said optical frequency comb.

18. The optical comb frequency source of claim 1 wherein the optically or electrically controllable element comprises:
    a first electrically or optically controllable system to control a spacing of said comb; and
    a second electrically or optically controllable system to control a frequency of said comb.

19. The optical comb frequency source of claim 1, wherein the optical cavity comprises a fiber laser.

20. A frequency downconversion system including an optical comb frequency source as claimed in claim 1.

21. The optical comb frequency source as claimed in claim 1 disposed in a photonic integrated circuit (PIC), the PIC comprising:
    an optical input to receive a pump signal;
    an optical output to provide an optical comb output signal; and
    a control block coupled to said optical cavity for controlling one or both of a comb spacing and a carrier envelope offset frequency of said optical comb.

22. The optical comb frequency source as claimed in claim 21 further comprising:
    an optical coupler having first and second optical connections to said optical input and said optical output and having a combined optical connection to carry a combination of said pump signal and said optical comb output signal; and
    wherein said optical cavity is coupled to said combined optical connection.

23. The optical comb frequency source as claimed in claim 21, wherein said control block comprises at least one electrically controllable optical element.

24. The optical comb frequency source as claimed in claim 21 wherein said control block comprises at least one optically controllable optical element.

25. The optical comb frequency source as claimed in claim 21 wherein said control block comprises one or more of an absorber, a controllable phase adjust element, and a controllable frequency selective element.

26. The optical comb frequency source as claimed in claim 21 wherein said carrier envelope offset frequency is controllable via said optical input.

27. The optical comb frequency source as claimed in claim 21 wherein said PIC comprises a hybrid PIC, and wherein said hybrid PIC includes a pump source coupled to said optical input.

28. A frequency downconversion system including an optical comb frequency source as claimed in claim 21.

29. A passive mode locked optical comb frequency source comprising:
- an optical comb output to provide an optical comb;
- an optical resonant cavity defined by a pair of reflecting elements, wherein said reflecting elements provide an optical input and an optical output to said optical resonant cavity;
- a pump laser having an optical output;
- a waveguide between said optical output of said pump laser and said optical input of said optical resonant cavity, wherein said waveguide is configured to define an optical loop including said optical resonant cavity;
- an optical directional coupler having a first input coupled to said optical output of said pump laser, having a second input coupled to said waveguide to receive said optical comb from said optical resonant cavity, and having an optical output coupled to said optical comb output;
- wherein said optical resonant cavity comprises, between said reflecting elements,
- (1) an absorbing element coupled to said optical resonant cavity for producing said optical comb and (2) an optically or electrically controllable element in said optical resonant cavity;
- wherein said pump laser is separate to said optical resonant cavity and is configured to pump said optical resonant cavity; and
- wherein said optically or electrically controllable element has an optically or electrically controllable refractive index such that said refractive index is variable to vary one or both of a mode spacing and a carrier envelope offset frequency of said optical comb.

* * * * *